Figure 1:
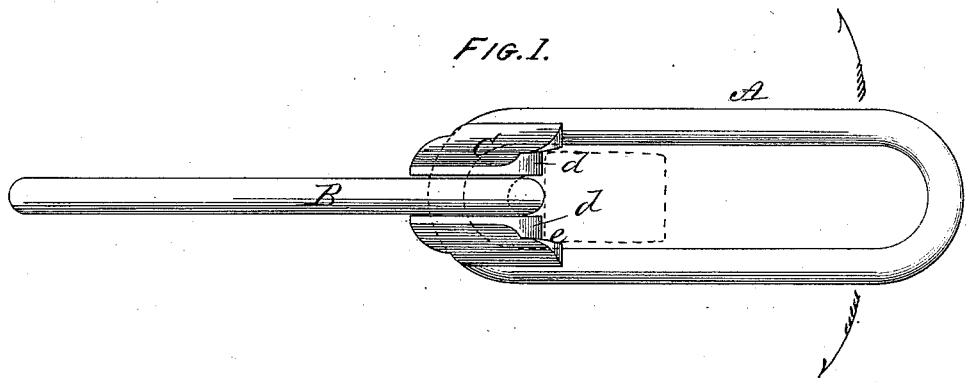

(Model.)

3 Sheets—Sheet 1.

J. M. DODGE.
CHAIN CABLE.

No. 264,139.

Patented Sept. 12, 1882.

WITNESSES:
Jacob Felbel.
H. Janvier.

INVENTOR
James M. Dodge.
BY J. N. McIntire
ATTORNEY (Model.)

3 Sheets—Sheet 2.

J. M. DODGE.
CHAIN CABLE.

No. 264,139.    Patented Sept. 12, 1882.

WITNESSES:
Jacob Felbel.
H. Spurrier

INVENTOR
James M. Dodge
BY J. N. McIntire
ATTORNEY (Model.) 3 Sheets—Sheet 3.
J. M. DODGE.
CHAIN CABLE.

No. 264,139. Patented Sept. 12, 1882.

WITNESSES:
Jacob Felbel
H. Janvier

INVENTOR
James M Dodge
BY J. N. McIntire
ATTORNEY

UNITED STATES PATENT OFFICE.

JAMES M. DODGE, OF CHICAGO, ILLINOIS.

CHAIN CABLE.

SPECIFICATION forming part of Letters Patent No. 264,139, dated September 12, 1882.

Application filed May 24, 1882. (Model.)

*To all whom it may concern:*

Be it known that I, JAMES MAPES DODGE, of Chicago, in the county of Cook and State of Illinois, have invented certain new and useful Improvements in Chain Cables; and I do hereby declare that the following is a full, clear, and exact description thereof, reference being had to the accompanying drawings, making part of this application.

My invention relates to a new and useful improvement in chain cables; and has for its main object to adapt this sort of cable to more successfully operate, in connection with sprocket-wheels, as a drive-chain, and for elevator and conveyer purposes.

Previous to my invention chain cables have been used to a greater or less extent in connection with wheels having their peripheries formed to effect an interlocking with the links of such cables; but it has been found impracticable to run such cables with much success on such wheels, mainly on account of the inadequacy of the bearing-surfaces afforded (by the links of such cables) to the sprockets or other interlocking devices on the periphery of the wheel, and, furthermore, on account of the liability of the links to get misplaced relatively to the wheels' interlocking devices, and thus render impossible a proper engagement of the cable with the sprockets or other engaging or interlocking portions of the wheel's periphery. It has also been common to use chain cables (more or less) in the construction of elevators and conveyers; but their use has not, so far as I can learn, been attended with much practical success in this connection, on account not only of the difficulties just mentioned of perfectly running such cables on the engaging peripheries of chain-wheels, but, furthermore, because of the liability of the cable to twist, and thus to cause not only a derangement of the chain relatively to the wheel's periphery, but also a displacement of buckets in the case of elevators, or of the flights in the case of conveyers.

I propose by my invention to overcome all these difficulties in and objections to the use of chain cables as drive chains or cables for elevator, conveyer, and other purposes, whether run on sprocket-wheels or wheels with other interlocking devices; and to this end my invention consists in the use, in combination with a chain cable, of blocks or bearing and retaining devices made preferably of some cast metal or material well adapted to stand friction and wear on cast-iron wheels, and adapted to afford good bearing-surfaces for the sprockets or other interlocking devices of the wheel's periphery to engage with, and also adapted to retain the links of the cable in proper relative position with each other and with the wheel, and thus render the cable incapable of twisting, all as will be hereinafter more fully explained.

To enable those skilled in the art to which my invention relates to fully understand and practice the same, I will now proceed to further describe the same, referring by letters to the accompanying drawings, forming part of this specification, and in which I have illustrated my said invention as carried into effect in a form under which I have so far successfully practiced it.

Figure 2:
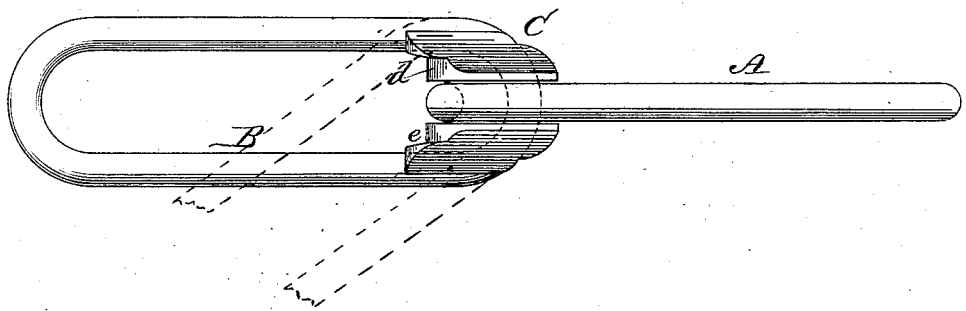
Figure 3:
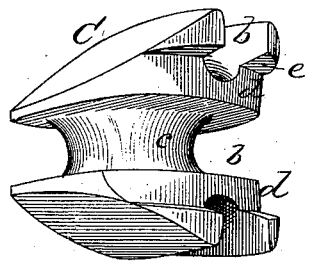
Figure 4:
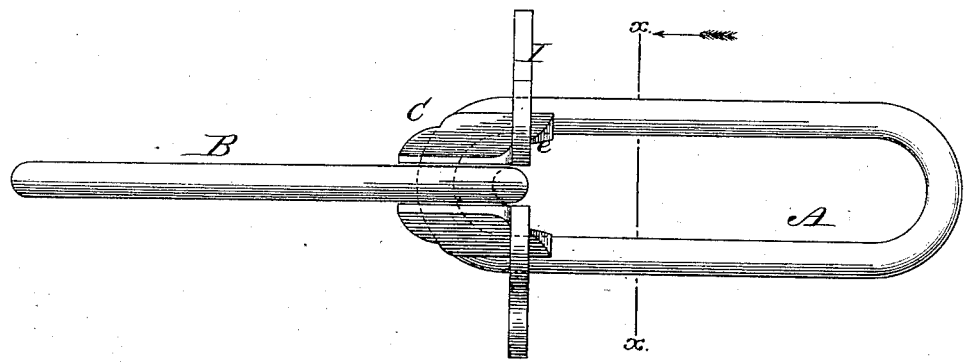
Figure 5:
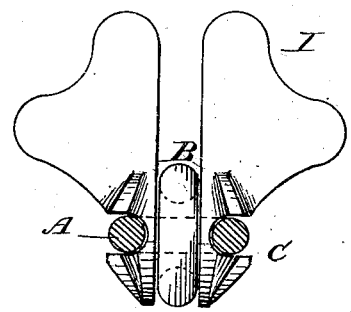
Figure 6:
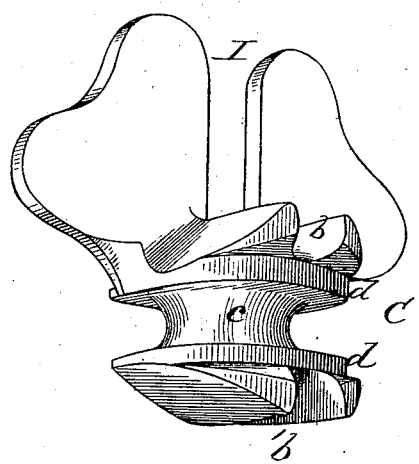
Figure 7:
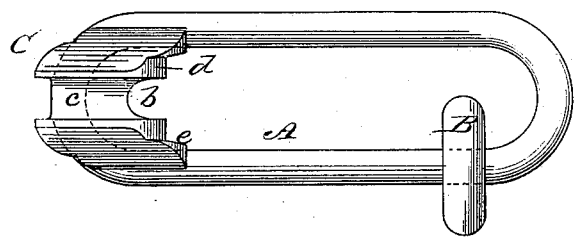
Figure 8:
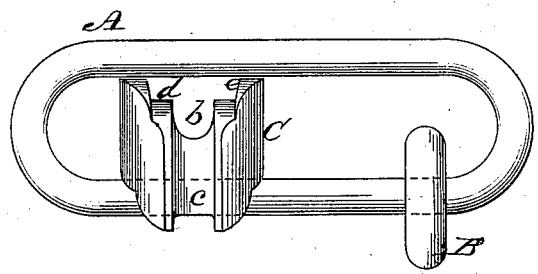

Figure 1 is a plan view of part of a chain-cable designed for use merely as a drive-chain. Fig. 2 is a side view of the same. Fig. 3 is a perspective view of the bearing and retaining block. Fig. 4 is a view similar to that seen at Fig. 1, but showing the bearing and retaining block formed with or supplemented with a carrier attachment adapted to support a conveyer-flight. Fig. 5 is a cross-section at $x\ x$, Fig. 4, looking in the direction indicated by the arrow. Fig. 6 is a perspective view of the attachment-block (seen at Fig. 5) detached from the chain-links. Fig. 7 is a plan view of the contrivance seen at Fig. 1, but showing one of the links removed from its working relative position with the bearing-block, in order to permit the removal of said block; and Fig. 8 is a similar view to Fig. 7, but showing the bearing-block moved or slipped round into a position to permit its easy separation from the chain.

In the several figures the same part, wherever shown, will be found designated by the same reference-letter.

A and B represent two links of an ordinary chain cable, and C is a cast-metal block, preferably of malleable iron, of such conformation (as shown, for instance) that it embraces the adjacent end portions of two links laterally in its grooves *b b*, (which lie in planes transverse to each other,) and at the same time affords a pintle-like bearing-surface about equal in diameter to the width of the opening or space between the side-bars of a link for each link to articulate or turn on, and also affords proper bearing-surfaces for the sprockets or other projections of the chain-wheel to work against. The pintle-like portions referred to are seen at *c*, and the portions of surfaces which serve for the wheels' sprockets to work against I have marked *d*.

By reference now to Fig. 1 it will be observed that if a contrivance such as there shown (in top view) be run over the periphery of a wheel from which project sprockets, (as, for instance, illustrated by the dotted lines at said figure) the said sprockets will take their bearing upon and will get an ample bearing at the portions *d*, while the portions *e* of the cast-iron blocks will bear sidewise against the sprockets of the wheel, thus avoiding any wear of the side bars of the link A on the sides of the sprockets; and it will be understood that under the conditions just explained the links arranged in vertical planes—as, for instance, the links B— will be free to turn or move articulately about one of each of the cast-iron blocks' pintle-like portions, as illustrated by the dotted lines at Fig. 2. On the other hand, if the chain be carried around a chain-wheel having a vertical axis, then the other horizontally-arranged links (as, for instance, A) can turn in either direction about the other one of each of the cast-iron blocks' pintle-like portions, as illustrated by the arrows at Fig. 1.

To separate the block from the links of the chain it is only necessary to manipulate the parts in a simple manner—as, for instance, is illustrated at Figs. 7 and 8, where one of the links is shown as having been moved out of engagement with and away from the block, and the block then turned to a relative position with the other link, in which, it is plain to be seen, said block may be moved away from said link. Of course, to re-engage the parts or rearrange the links and block in their working relative positions it is only necessary to reverse the order of the just-mentioned movements of the parts.

A great advantage is gained by the use of the separate bearing-blocks on the score alone of thus providing a chain-cable with surfaces for engagement with a chain-wheel which not only are of a better shape than any bearing-surface which it is possible to get on the links of such a cable, but may be composed of a material or quality of metal very much better adapted to stand the wear and friction incident to the action of the sprockets of the usual cast-iron chain-wheels than any material or metal of which chain cables either are made or can well be manufactured.

It will be seen that not only is every part of the links of the cable protected from wear and tear on the chain-wheels by the use of the malleable cast-iron blocks in the manner shown, but that the wear and strain on the links are less than if they engaged directly with each other at their enchained ends, (without the interposition of the pintle-like portions of the cast-metal blocks,) mainly because of the greater diameter of the said pintle-like portions; and, secondarily, because of the link coming into contact with the surface of a material, against which it will work with less wear than against one similar in kind to itself.

The adjacent ends of the links are held, it will be seen, in a given relationship laterally with each other and with the interposed block, so that there cannot possibly occur to the cable (while under tension or in a working condition) any of that twisting of the cable (or that oscillation of the links about an axial line coincident with a line running lengthwise through the center of the cable) which is inevitable in chain cables in which the links are articulated one directly on the other, as usual prior to my invention, and the chain with its block is necessarily retained in a given and proper relationship with the peripheral devices of the wheel on which it is run. This perfect avoidance of any such twisting of the cable and retention of the working parts of the chain and wheel in proper relationship enable me to use the cable with perfect success for all sorts of elevator and conveyer purposes, since the chain is thus rendered capable of carrying and maintaining always in perfect line and proper position any buckets, flights, or other attachments which may be applied to it.

A chain cable made according to my invention may, for instance, have the blocks formed or provided with carried attachments—such as seen at I, Figs. 4, 5, and 6—adapted to carry the flights of a conveyer, which may be required to move all in a given position and with perfect regularity.

Of course, any and all sorts of attachments may be combined with my improved cable either by direct connection in the blocks or with the links A or B, because in neither case can any conveyor or elevator device applied to the cable become disarranged relatively to anything with which it should maintain a given relationship by any twisting action of the cable.

The precise form of block shown, as well as that of the links illustrated, may of course be departed from without departing from my invention so long as the blocks and links be made and combined so as to effect the essential results explained, and, as already indicated, the cable may be adapted for and may be used with a wheel having other engaging devices than the usual sprockets.

What I claim as new, and desire to secure by Letters Patent, is—

1. In a chain cable, the combination, with the links of blocks interposed between the adjacent end portions of the links, the said blocks being adapted to afford bearing or working surfaces for the actions of the engaging devices of a chain-wheel, substantially as set forth.

2. In combination with the links of a chain cable, blocks interposed between the adjacent ends of the links and provided with grooves which afford pintle-like bearings for the said link ends, substantially as set forth.

3. In combination with two enchained links, a block having grooves arranged transversely to each other and operating to prevent any twisting movement of said links relatively, substantially as set forth.

In witness whereof I have hereunto set my hand this 16th day of May, 1882.

JAMES M. DODGE.

In presence of—
T. S. FAUNTLEROY,
GLENN G. HOWE.